(12) United States Patent
Ui et al.

(10) Patent No.: US 11,105,225 B2
(45) Date of Patent: Aug. 31, 2021

(54) BINARY POWER GENERATION SYSTEM AND CONTROL APPARATUS

(71) Applicant: FUJI ELECTRIC CO., LTD., Kanagawa (JP)

(72) Inventors: Shinya Ui, Hachioji (JP); Tadashi Komatsu, Ichihara (JP); Kuniyuki Takahashi, Hino (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 534 days.

(21) Appl. No.: 15/628,594

(22) Filed: Jun. 20, 2017

(65) Prior Publication Data

US 2017/0284231 A1  Oct. 5, 2017

Related U.S. Application Data

(63) Continuation of application No. PCT/JP2016/053594, filed on Feb. 5, 2016.

(30) Foreign Application Priority Data

Mar. 5, 2015  (JP) .............................. JP2015-043538

(51) Int. Cl.
*F01K 23/10* (2006.01)
*F02G 5/04* (2006.01)
(Continued)

(52) U.S. Cl.
CPC ................. *F01K 23/10* (2013.01); *B63J 3/02* (2013.01); *F01K 23/065* (2013.01);
(Continued)

(58) Field of Classification Search
CPC .... F02C 9/28; F05D 2220/72; F05D 2270/08; F05D 2270/0831; F05D 2270/112;
(Continued)

(56) References Cited

U.S. PATENT DOCUMENTS 3,930,367 A * 1/1976 Gasparoli ............... F01K 13/02
60/39.182
3,955,358 A * 5/1976 Martz ..................... F01K 13/02
60/39.182
(Continued)

FOREIGN PATENT DOCUMENTS

CN  202851187 U  4/2013
CN  103615310 A  3/2014
(Continued)

OTHER PUBLICATIONS

Office Action issued for counterpart Chinese Application 201680004286.8, issued by the State Intellectual Propert Office of Peoples Republic of China dated Sep. 11, 2019.
(Continued)

*Primary Examiner* — Gerald L Sung
*Assistant Examiner* — William L Breazeal (57) ABSTRACT

Provided is a new binary power generation system that, in the binary power generation system using exhaust gas as a heating source, maximizes the power generation amount while considering the sulfuric acid dew point temperature of the exhaust gas. In this binary power generation system, corrosion due to sulfuric acid is prevented. Provided is a binary power generation system including a binary power generation apparatus that generates power by vaporizing a power generation medium using heat of exhaust gas output from a drive apparatus, wherein the binary power generation apparatus includes a control section that controls a mass flow rate of the power generation medium based on at least a sulfur concentration of the exhaust gas.

8 Claims, 4 Drawing Sheets

(51) Int. Cl.
   *B63J 3/02* (2006.01)
   *F01N 5/02* (2006.01)
   *F01K 23/06* (2006.01)
   *F01K 27/02* (2006.01)

(52) U.S. Cl.
   CPC .............. *F01K 23/101* (2013.01); *F01N 5/02* (2013.01); *F02G 5/04* (2013.01); *F01K 27/02* (2013.01); *Y02T 90/40* (2013.01)

(58) Field of Classification Search
   CPC .... F05D 2270/311; F01K 9/003; F01K 13/02; F01K 23/10; F01K 23/101; Y02E 20/16
   See application file for complete search history.

(56) References Cited

U.S. PATENT DOCUMENTS

| | | | | |
|---|---|---|---|---|
| 4,841,722 | A * | 6/1989 | Bjorge | F22D 1/40 60/39.182 |
| 4,975,257 | A * | 12/1990 | Lin | B01D 53/508 422/62 |
| 4,976,100 | A * | 12/1990 | Lee | F01K 23/108 60/39.182 |
| 5,050,375 | A * | 9/1991 | Dickinson | C02F 11/086 110/238 |
| 5,706,644 | A | 1/1998 | Nielsen | |
| 6,430,914 | B1 * | 8/2002 | Goidich | F01K 23/061 122/7 R |
| 7,695,636 | B2 * | 4/2010 | Fukushima | C09K 5/045 252/67 |
| 2009/0008599 | A1 | 1/2009 | Masato | |
| 2014/0216365 | A1 * | 8/2014 | Rancruel | F22D 5/00 122/7 R |
| 2014/0224469 | A1 * | 8/2014 | Mirmobin | F24H 9/2007 165/244 |

FOREIGN PATENT DOCUMENTS

| | | |
|---|---|---|
| JP | H03-115707 A | 5/1991 |
| JP | H07-058043 B2 | 6/1995 |
| JP | H08-246815 A | 9/1996 |
| JP | 2000-329322 A | 11/2000 |
| JP | 2002-021508 A | 1/2002 |
| JP | 2005-009792 A | 1/2005 |
| JP | 2007-211760 A | 8/2007 |
| JP | 2011-237048 A | 11/2011 |
| JP | 2012-026425 A | 2/2012 |
| JP | 2013-154329 A | 8/2013 |
| JP | 2013-204969 A | 10/2013 |
| JP | 2013-217221 A | 10/2013 |

OTHER PUBLICATIONS

Jiang Sen et al, "Calculation of Acid Dew Point Temperature for Heat Recovery Boiler", Heilongjiang Electric Power, Aug. 2002, vol. 24, No. 4 pp. 298-299/316, China Academic Journal Electronic Publishing House.

Office Action issued for counterpart Chinese Application 201680004286.8, issued by the Chinese Intellectual Property Office dated Jul. 31, 2018.

International Search Report for International Patent Application No. PCT/JP2016/053594, issued by the Japan Patent Office dated May 10, 2016.

Office Action issued for counterpart Korean Application 10-2017-7016838, issued by the Korean Intellectual Property Office dated Jun. 3, 2021.

* cited by examiner

BINARY POWER GENERATION SYSTEM AND CONTROL APPARATUS

The contents of the following Japanese patent applications are incorporated herein by reference:
NO. 2015-043538 filed in JP on Mar. 5, 2015, and
PCT/JP2016/053594 filed on Feb. 5, 2016.

BACKGROUND

1. Technical Field

The present invention relates to a binary power generation system, a control apparatus, and a non-transitory computer-readable storage medium.

2. Related Art

The sulfur oxide included in exhaust gas can be converted into sulfuric acid vapor. Sulfuric acid vapor condenses at a temperature less than or equal to a dew point temperature. Conventional technology is known for, in a boiler using the heat of exhaust gas, restricting corrosion of metal caused by the condensed sulfuric acid, as shown in Patent Documents 1 and 2, for example.
Patent Document 1: Japanese Patent Application Publication No. 2005-009792
Patent Document 2: Japanese Patent Application Publication No. 2013-204969

A binary power generation system is known that includes a heating source and a power generation medium. In the binary power generation system, the heating source causes the power generation medium to evaporate. The evaporated power generation medium rotates a steam turbine, thereby causing the binary power generation system to generate power. Up to this point, the exhaust gas serving as the heating source of the binary power generation system is not used. Therefore, the dew point temperature of sulfuric acid is not taken into consideration in the power generation of the binary power generation system.

SUMMARY

According to a first aspect of the present invention, provided is a binary power generation system comprising a binary power generation apparatus. The binary power generation apparatus may generate power by vaporizing a power generation medium using heat of exhaust gas output from a drive apparatus. The binary power generation apparatus may include a control section. The control section may control a mass flow rate of the power generation medium based on at least a sulfur concentration of the exhaust gas.

The binary power generation apparatus may include a power generating section. The power generating section may include a vaporizer and a power generator. The power generation medium that exchanges heat with the exhaust gas may be introduced into the vaporizer. The power generator may generate power using the power generation medium vaporized by the vaporizer. The control section may control the mass flow rate of the power generation medium further based on a dew point temperature of the exhaust gas between the drive apparatus and the vaporizer. The control section may control the mass flow rate of the power generation medium further based on an exhaust temperature, which is a temperature of the exhaust gas expelled from the vaporizer.

The power generating section may include a condenser and a power generation medium pump. The condenser may liquefy the power generation medium vaporized in the vaporizer and expelled from the power generator. The power generation medium pump may cause the power generation medium liquefied by the condenser to flow into the vaporizer. The binary power generation apparatus may further comprise a cooling section. The cooling section may cool the power generation medium in the condenser. The cooling section may include a cooling medium pump that causes a cooling medium to flow into the condenser. The control section may control a volumetric flow rate of the cooling medium pump according to fluctuation of a supercooling degree of the power generation medium in the condenser that changes according to the mass flow rate of the power generation medium pump.

The control section may control the mass flow rate of the power generation medium pump further based on the mass flow rate of the power generation medium pump determined based on the dew point temperature and the exhaust temperature of the exhaust gas and the mass flow rate of the power generation medium pump determined based on an output instruction value of power generation set for the control section and current output of the power generator. The power generating section may further include a first detector. The first detector may measure temperature and pressure of the power generation medium between the condenser and the power generation medium pump. The control section may calculate the mass flow rate of the power generation medium pump and the volumetric flow rate of the cooling medium pump based on the temperature and the pressure of the power generation medium measured by the first detector. The control section may control at least one of the mass flow rate of the power generation medium pump and the volumetric flow rate of the cooling medium pump based on the calculated mass flow rate and volumetric flow rate.

The control section may calculate the supercooling degree of the power generation medium based on the temperature and the pressure of the power generation medium measured by the first detector. The control section may calculate the mass flow rate of the power generation medium pump and the volumetric flow rate of the cooling medium pump based on the supercooling degree and a supercooling degree instruction value of the cooling medium set for the control section. The control section again may calculate the mass flow rate of the power generation medium pump and the volumetric flow rate of the cooling medium pump further based on the supercooling degree instruction value of the cooling medium set for the control section and the supercooling degree of the power generation medium changed as a result of at least one of the mass flow rate of the power generation medium pump and the volumetric flow rate of the cooling medium pump being controlled based on the calculated mass flow rate and volumetric flow rate.

The power generating section may include a buffer tank between the vaporizer and the power generator. The buffer tank may temporarily store the power generation medium that was vaporized by the vaporizer and the power generation medium that was not vaporized by the vaporizer. The control section may control the mass flow rate of the power generation medium pump further based on a level instruction value indicating an upper limit of an amount of liquid in the buffer tank set for the control section and a current amount of liquid in the buffer tank.

The power generating section may further include a second detector. The second detector may measure the temperature and the pressure of the power generation medium between the buffer tank and the power generator.

The control section may calculate a superheating degree of the power generation medium based on the temperature and the pressure of the power generation medium measured by the second detector. The control section may control the mass flow rate of the power generation medium pump further based on the calculated superheating degree of the power generation medium and the superheating degree instruction value indicating a lower limit of the superheating degree set for the control section.

The binary power generation apparatus may further include a display apparatus. The control section may display, in the display apparatus, which one of the dew point temperature of the exhaust gas, the supercooling degree instruction value of the cooling medium, the superheating degree instruction value indicating the lower limit of the superheating degree, and the level instruction value indicating the upper limit of the amount of liquid in the buffer tank is limiting the power generation amount, when the power generation amount requested by the control section is being limited to be lower than the output instruction value.

The control section may control the mass flow rate of the power generation medium pump based on only one of the mass flow rate of the power generation medium pump determined based on the dew point temperature and the exhaust temperature of the exhaust gas and the mass flow rate of the power generation medium pump determined based on the output instruction value and the current output.

The control section may compare a change amount of the mass flow rate of the power generation medium pump determined based on the dew point temperature and the exhaust temperature of the exhaust gas and a change amount of the mass flow rate of the power generation medium pump determined based on the output instruction value and the current output, and control the mass flow rate of the power generation medium pump based on a smallest change amount among the change amounts.

The control section may control the mass flow rate of the power generation medium pump based on only one of the mass flow rate of the power generation medium pump determined based on the dew point temperature and the exhaust temperature of the exhaust gas, the mass flow rate of the power generation medium pump determined based on the output instruction value and the current output, and the mass flow rate of the power generation medium pump determined based on a supercooling degree instruction value and the supercooling degree.

The control section may control the cooling medium pump based on the supercooling degree instruction value and the supercooling degree, compare a change amount of the mass flow rate of the power generation medium pump determined based on the dew point temperature and the exhaust temperature of the exhaust gas, a change amount of the mass flow rate of the power generation medium pump determined based on the output instruction value and the current output, and a change amount of the mass flow rate of the power generation medium pump determined based on the supercooling degree instruction value and the supercooling degree, and adjust the mass flow rate of the power generation medium pump based on a smallest change amount among the change amounts.

The control section may control the mass flow rate of the power generation medium pump based on only one of the mass flow rate of the power generation medium pump determined based on the dew point temperature and the exhaust temperature of the exhaust gas, the mass flow rate of the power generation medium pump determined based on the output instruction value and the current output, the mass flow rate of the power generation medium pump determined based on the supercooling degree instruction value and the supercooling degree, the mass flow rate of the power generation medium pump determined based on the level instruction value and the current amount of liquid, and the mass flow rate of the power generation medium pump determined based on the superheating degree instruction value and the superheating degree.

The control section may control the cooling medium pump based on the supercooling degree instruction value and the supercooling degree, compare a change amount of the mass flow rate of the power generation medium pump determined based on the dew point temperature and the exhaust temperature of the exhaust gas, a change amount of the mass flow rate of the power generation medium pump determined based on the output instruction value and the current output, a change amount of the mass flow rate of the power generation medium pump determined based on the supercooling degree instruction value and the supercooling degree, a change amount of the mass flow rate of the power generation medium pump determined based on the level instruction value and the current amount of liquid, and a change amount of the mass flow rate of the power generation medium pump determined based on the superheating degree instruction value and the superheating degree, and adjust the mass flow rate of the power generation medium pump based on a smallest change amount among the change amounts. The binary power generation system may be a power generation system for a ship and is provided in the ship.

According to a second aspect of the present invention, provided is a control apparatus that controls a binary power generation apparatus generating power by vaporizing a power generation medium using heat of exhaust gas output from a drive apparatus. The control apparatus may control a mass flow rate of the power generation medium based on at least a sulfur concentration of the exhaust gas. According to a second aspect of the present invention, provided is a computer readable storage medium storing thereon a program that causes a computer to function as the control apparatus according to the second aspect.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
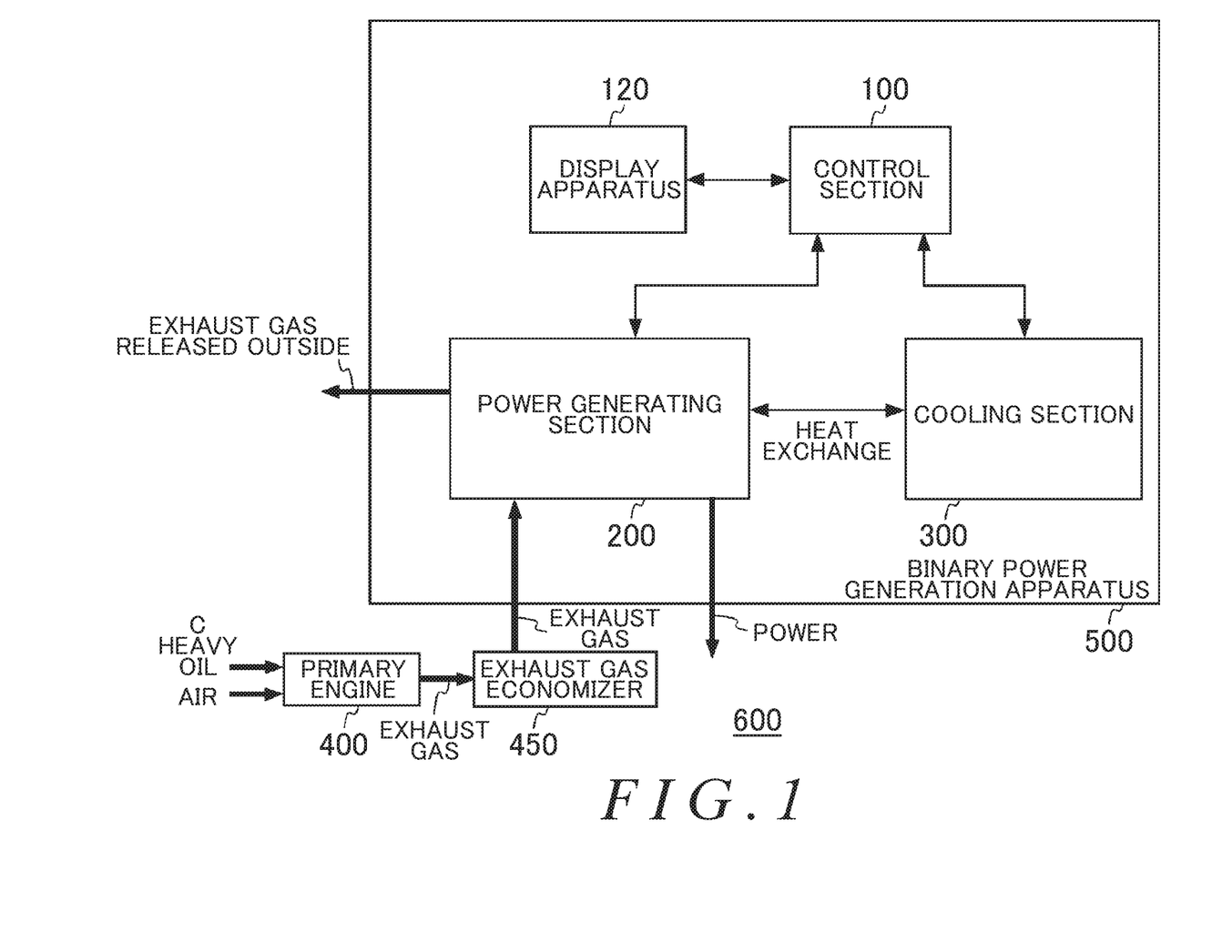
FIG. 1 shows a binary power generation system 600 that includes a main engine 400, an exhaust gas economizer 450, and a binary power generation apparatus 500.

FIG. 1 shows a binary power generation system 600 that includes a main engine 400, an exhaust gas economizer 450, and a binary power generation apparatus 500. The binary power generation system 600 of the present example is a power generation system for a ship and is provided in the ship. However, the binary power generation apparatus 500 may be adopted as a power generation apparatus in a waste incineration apparatus.

The main engine 400 of the present example is an engine that generates propulsion for the ship. The main engine 400 takes in C heavy oil and air. By causing combustion of the C heavy oil and the air, the main engine 400 generates propulsion. After the combustion, the main engine 400 expels the exhaust gas to the exhaust gas economizer 450. The C heavy oil refers to C heavy oil among A heavy oil, B heavy oil, and C heavy oil classified according to kinematic viscosity.

The exhaust gas economizer 450 is an apparatus for causing heat exchange between the exhaust gas and water passing through a pipe. The exhaust gas economizer 450 of the present example is provided inside a chimney of the ship. The exhaust gas that has passed through the exhaust gas economizer 450 enters into the power generating section 200 of the binary power generation apparatus 500. The temperature of the exhaust gas entering the power generating section 200 from the exhaust gas economizer 450 is less than or equal to 200° C., for example.

The binary power generation apparatus 500 includes a control section 100, a display apparatus 120, a power generating section 200, and a cooling section 300. The control section 100 may be treated as being the control apparatus. The control section 100 controls the operation of the power generating section 200 and the cooling section 300. The operation of the control section 100 is described further below in FIGS. 2 and 3. The control section 100 displays the state of the current control in the display apparatus 120.

The power generating section 200 generates power by using the heat of the exhaust gas output from the main engine 400 serving as a drive apparatus to vaporize the power generation medium. The power generating section 200 releases the used exhaust gas to the outside of the ship. A cooling medium of the cooling section 300 performs heat exchange with the power generation medium of the power generating section 200. In other words, the cooling medium of the cooling section 300 cools the power generation medium of the power generating section 200.

Figure 2:
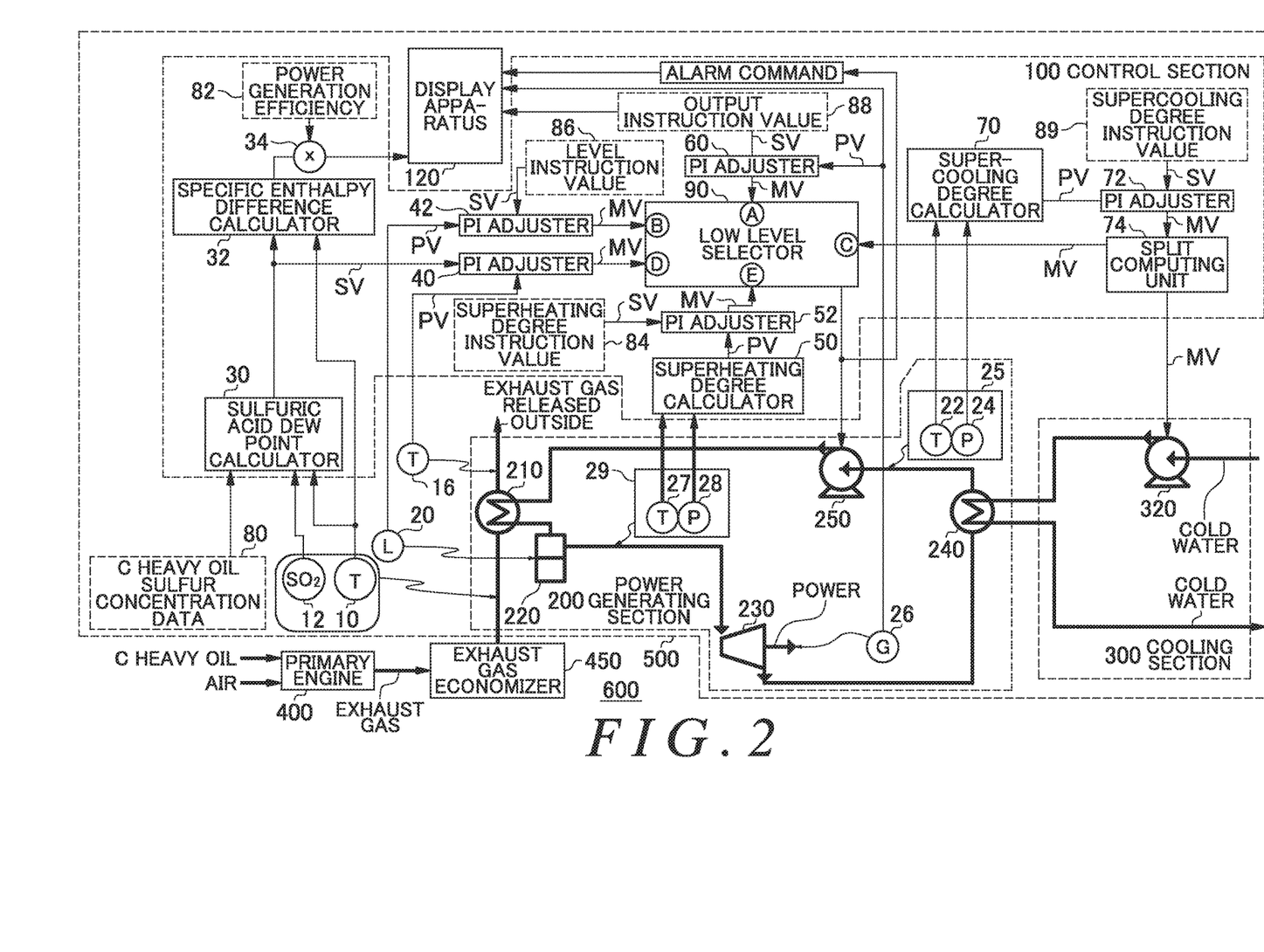
FIG. 2 shows the details of the binary power generation apparatus 500.

FIG. 2 shows the details of the binary power generation apparatus 500. As described above, the binary power generation apparatus 500 includes the control section 100, the display apparatus 120, the power generating section 200, and the cooling section 300.

(Configuration of the Power Generating Section 200)

The power generating section 200 includes a vaporizer 210, a buffer tank 220, a power generator 230, a condenser 240, and a power generation medium pump 250. The vaporizer 210 of the present example is provided inside the chimney of the ship. The power generation medium that exchanges heat with the exhaust gas is introduced to the vaporizer 210. The power generation medium that has exchanged heat with the exhaust gas becomes a power generation medium that has been vaporized by the vaporizer 210 and a power generation medium that has not been vaporized by the vaporizer 210.

The buffer tank 220 is provided between the vaporizer 210 and the power generator 230. The buffer tank 220 temporarily stores the liquid and gas of the power generation medium. By providing the buffer tank 220, it is possible to prevent the liquid of the power generation medium that was not vaporized in the vaporizer 210 from contacting the steam turbine of the power generator 230. The power generation medium that was vaporized by the vaporizer 210 causes the steam turbine of the power generator 230 to rotate. In this way, the power generator 230 generates power.

The power generation medium vaporized in the vaporizer 210 and expelled from the power generator 230 enters the condenser 240. The condenser 240 liquefies the power generation medium that has entered into the condenser 240. The condenser 240 causes a heat exchange between the gas of the power generation medium and the cooling medium of the cooling section 300. Specifically, the condenser 240 liquefies the power generation medium by cooling the power generation medium with the cooling medium. In the power generation medium pump 250, it is preferable that only the liquid not including gas is sucked up. Therefore, the condenser 240 supercools the power generation medium with the cooling medium.

The power generating section 200 includes a first detector 25 that measures the temperature and pressure of the power generation medium between the condenser 240 and the power generation medium pump 250. The first detector 25 includes a thermometer 22 and a pressure gauge 24. The temperature and pressure measured by the thermometer 22 and the pressure gauge 24 are used by the control section 100 to calculate the supercooling degree of the power generation medium.

The supercooling degree is the difference between the saturation temperature of the liquid at a certain pressure and the temperature of the liquid in a supercooled state at this pressure. When the supercooling degree increases, the drive load of the power generation medium pump 250 increases accordingly. A load that is larger than necessary for the power generation medium pump 250 leads to power loss in the binary power generation apparatus 500. As described further below, the control section 100 of the present example controls the power generation medium pump 250 and the cooling medium pump 320 described further below in a manner to minimize this power loss.

The power generation medium pump 250 sucks up the power generation medium liquefied by the condenser 240. The power generation medium pump 250 causes the sucked up power generation medium to flow into the vaporizer 210. The mass flow rate of the power generation medium in the power generation medium pump 250 is controlled by the control section 100.

The power generating section 200 includes a second detector 29 that measures the temperature and pressure of the power generation medium between the buffer tank 220 and the power generator 230. The second detector 29 includes a thermometer 27 and a pressure gauge 28. The temperature and pressure measured by the thermometer 27 and the pressure gauge 28 are used to calculate a superheating degree of the power generation medium.

The superheating degree is the difference between the pressure of the saturated vapor at a certain temperature and the pressure of the superheated vapor at this temperature. When the superheating degree is small, the gas has a possibility of condensing. As described further below, the control section 100 controls the superheating degree of the power generation medium such that the liquid does not contact the steam turbine of the power generator 230.

(Configuration of the Cooling Section 300)

The cooling section 300 cools the power generation medium with the cooling medium in the condenser 240. The cooling section 300 includes a cooling medium pump 320 that causes the cooling medium to flow into the condenser 240 of the power generating section 200.

The cooling medium of the present example is sea water. Instead, the cooling medium may be a liquid such as pure water. The cooling medium pump 320 of the present example sucks up sea water from the sea to flow to the condenser 240. The sucked up sea water performs heat exchange with the power generation medium in the condenser 240 and cools the power generation medium. The cooling medium pump 320 may release the sea water back to the sea when the difference between the temperature of the sea water after the heat exchange and the temperature at a prescribed depth in the sea is less than or equal to 10° C.

(Control by the Control Section 100)

The control section 100 controls the mass flow rate of the power generation medium in the power generation medium pump 250. Furthermore, the control section 100 controls the volumetric flow rate of the cooling medium in the cooling medium pump 320. The control section 100 includes a plurality of PI adjusters 40, 42, 52, 60, and 72. The control section 100 further includes a sulfuric acid dew point calculator 30, a specific enthalpy difference calculator 32, a superheating degree calculator 50, a supercooling degree calculator 70, a split computing unit 74, and a low level selector 90. The calculators, computing unit, and selector of the control section 100 may be configured as hardware, or may be configured as software.

The "P" and "I" in the PI adjuster 40 refer respectively to "Proportional" and "Integral." The PI adjuster 40 calculates an MV (Manipulative Variable) based on the deviation between a PV (Process Variable) and an SV (Set Variable), in order to bring the PV closer to the SV.

For example, the PI adjuster 40 calculates the MV in proportion to the deviation between the SV and the PV. This is referred to as proportional control. In the case of proportional control, MV becomes smaller as the deviation becomes smaller. With the proportional control, there are cases where time is needed to make the PV and the SV match.

Therefore, the PI adjuster 40 accumulates the remaining deviation between the SV and the PV over time, and calculates the remaining deviation accumulated to a constant amount as the MV. This is referred to as integral control. The PI adjuster 40 may calculate the MV to bring the PV closer to the SV, using the proportional control and integral control. The other PI adjusters 42, 52, 60, and 72 may also each calculate an MV in response to the input of a PV and an SV using the proportional control and the integral control in the same manner. It should be noted that the PV, SV, and MV values may be different for each PI adjuster.

The PI adjusters 40, 42, 52, and 60 each input the calculated MV to the low level selector 90. The low level selector 90 converts the plurality of MVs input from the PI adjusters 40, 42, 52, and 60 into a change amount of the mass flow rate of the power generation medium pump 250.

The PI adjuster 72 calculates the MVs for controlling the power generation medium pump 250 and the cooling medium pump 320. The PI adjuster 72 inputs the calculated MVs to the split computing unit 74. The split computing unit 74 inputs the MV that is a manipulation variable of the power generation medium pump 250 to the low level selector 90. Furthermore, the split computing unit 74 calculates an MV that is a manipulation variable of the cooling medium pump 320. With this calculated MV, the volumetric flow rate of the cooling medium pump 320 is controlled.

In the power generating section 200, when the mass flow rate of the power generation medium pump 250 is changed, the temperature of the exhaust gas expelled to the outside, the amount of liquid in the buffer tank 220, the superheating degree of the power generation medium, the power output by the power generator 230, the supercooling degree of the power generation medium, and the like are affected. In this way, the value of each PV can change.

The mass flow rate of the power generation medium pump 250 and the power generation amount of the power generator 230 are proportional. Specifically, when the mass flow rate of the power generation medium pump 250 increases, the power generation amount of the power generator 230 increases. The control section 100 controls the vaporizer 210, the buffer tank 220, the power generator 230, the condenser 240, the power generation medium pump 250, and the cooling medium pump 320 in a manner to operate safely, while maximizing the power generation amount of the power generating section 200.

The MV that is smallest means that the PV value is closest to the SV. Each SV is set to a value in a range in which the vaporizer 210, the buffer tank 220, the power generator 230, the condenser 240, the power generation medium pump 250, and the cooling medium pump 320 operate safely. In order to protect a component that is closest to its SV, i.e. a device operating at its limit, the mass flow rate of the power generation medium pump 250 may be limited by the smallest MV. Since MVs cannot be directly compared to each other, the low level selector 90 converts each MV into a change amount of the mass flow rate of the power generation medium pump 250 and makes a comparison.

The low level selector 90 selects the smallest change amount from among the change amounts of the mass flow rate of the power generation medium pump 250 converted from the MVs input from the plurality of PI adjusters 40, 42, 52, and 60 and the change amount of the mass flow rate of the power generation medium pump 250 converted from the manipulation variable MV input from the split computing unit 74. The low level selector 90 controls the power generation medium pump 250 in a manner to operate according to the smallest change amount. In this way, it is possible to protect the devices, pumps, and the like while maximizing the power generation amount.

(Control Based on the Sulfuric Acid Dew Point Temperature)

The exhaust gas includes sulfur dioxide ($SO_2$) and sulfur trioxide ($SO_3$). The sulfur trioxide reacts with water ($H_2O$). In this way, sulfuric acid ($H_2SO_4$) is generated. When the inside of the chimney of the ship through which the exhaust gas passes has a temperature less than or equal to the dew point temperature, the generated sulfuric acid condenses. In this case, the liquid sulfuric acid corrodes the metal components of the vaporizer 210 provided inside the chimney of the ship. When the vaporizer 210 corrodes, there is a possibility of the power generation medium leaking out from the corroded portion. When the power generation medium leaks from the vaporizer 210, it is no longer possible to use the power generating section 200. In this case, a large amount of cost and time is needed to repair the ship including the power generating section 200. Therefore, it is necessary to prevent corrosion of the vaporizer 210.

The control section 100 includes a sulfuric acid dew point calculator 30. The sulfuric acid dew point calculator 30 calculates the sulfuric acid dew point using the concentration of sulfur dioxide and the temperature of the exhaust gas between the vaporizer 210 and the main engine 400 serving as the drive apparatus and also the concentration of the sulfur (S) in the C heavy oil used by the main engine 400.

A thermometer 10 and a concentration sensor 12 are provided inside the chimney of the ship. The thermometer 10 and the concentration sensor 12 measure the temperature of the exhaust gas and the concentration of the sulfur dioxide between the exhaust gas economizer 450 and the vaporizer 210.

The sulfur concentration in the C heavy oil can be known from a fuel component chart at the time of purchase. The known sulfur concentration can be used as sulfur concentration data 80 of the C heavy oil.

According to current technical knowledge, it is difficult to directly measure the concentration of sulfur trioxide. In contrast, it is easy to measure the concentration of sulfur dioxide. Furthermore, the conversion rate at which the sulfur dioxide is converted to sulfur trioxide is determined according to the sulfur concentration data 80 of the C heavy oil. The sulfuric acid dew point calculator 30 calculates the sulfuric acid dew point temperature using this conversion rate and the temperature.

The exhaust gas that has passed through the vaporizer 210 is released to the outside from the tip of the chimney of the ship. The exhaust temperature of the exhaust gas after having passed through the vaporizer 210 but before being released to the outside is measured according to the thermometer 16 provided inside the chimney of the ship.

The control section 100 controls the mass flow rate of the power generation medium in the power generating section 200 based on at least the sulfur concentration of the exhaust gas measured by the concentration sensor 12. Specifically, the control section 100 controls the mass flow rate of the power generation medium in the power generating section 200 based on the dew point temperature calculated from the sulfur concentration or the like of the exhaust gas between the main engine 400 and the vaporizer 210. Furthermore, the control section 100 controls the mass flow rate of the power generation medium in the power generating section 200 based on the exhaust temperature, which is the temperature of the exhaust gas expelled to the outside from the vaporizer 210.

Specifically, the sulfuric acid dew point calculator 30 calculates the sulfuric acid dew point temperature from the sulfur concentration of the exhaust gas measured by the concentration sensor 12. The sulfuric acid dew point calculator 30 inputs the calculated sulfuric acid dew point temperature to the PI adjuster 40 as the SV. Furthermore, the control section 100 inputs the exhaust temperature of the exhaust gas measured by the thermometer 16 to the PI adjuster 40 as the PV. The PI adjuster 40 calculates the MV to bring the PV closer to the SV. The PI adjuster 40 inputs the calculated MV to an input terminal D of the low level selector 90. The SV that is the sulfuric acid dew point temperature is a lower limit value for the temperature of the exhaust gas released to the outside.

The low level selector 90 calculates the change of the mass flow rate of the power generation medium pump 250 corresponding to the MV calculated by the PI adjuster 40. Compared to other PI adjusters and the like, if the change of the mass flow rate of the power generation medium pump 250 corresponding to the MV calculated by the PI adjuster 40 is the smallest, the control section 100 adjusts the mass flow rate of the power generation medium pump 250 by the MV calculated by the PI adjuster 40. In other words, when control is performed according to the sulfuric acid dew point temperature, it is possible to perform control while considering the requested power generation amount and current output, the amount of water in the buffer tank 220, the superheating degree, and the supercooling degree.

The mass flow rate of the power generation medium pump 250 and the amount of heat exchange between the exhaust gas and the power generation medium are proportional. Furthermore, if the mass flow rate of the power generation medium pump 250 increases, the power generation amount of the power generator 230 increases and the exhaust temperature (PV) of the exhaust gas decreases. It should be noted that, to prevent condensation of the sulfuric acid, the exhaust temperature (PV) of the exhaust gas must always be greater than the sulfuric acid dew point temperature (SV). Therefore, in order to maximize the power generation amount while preventing condensation of the sulfuric acid, the mass flow rate of the power generation medium pump 250 is adjusted. In this way, it is possible to prevent corrosion of the vaporizer 210 while maximizing the power generation amount in the power generating section 200. In particular, even when the sulfuric acid dew point temperature fluctuates due to the combustion state of the fuel, in the present example, when performing control with the sulfuric acid dew point temperature, the control is performed while considering the requested power generation amount and current output, the amount of water in the buffer tank 220, the superheating degree, and the supercooling degree, and therefore it is possible to correspond properly to this fluctuation and maximize the power generation amount while preventing condensation of the sulfuric acid.

As described above, a significant amount of cost and time is needed to perform repairs when the vaporizer 210 is corroded. Therefore, the sulfuric acid dew point calculator 30 may set the sulfuric acid dew point to be a temperature that is even higher than the calculated sulfuric acid dew point. For example, if the calculated sulfuric acid dew point temperature is 115° C., the sulfuric acid dew point calculator 30 may take a further margin of 25° C. and set the sulfuric acid dew point temperature to be 140° C. The margin temperature may be determined as desired in the design stage or usage stage. In this way, it is possible to reliably prevent corrosion of the vaporizer 210 in the power generating section 200.

(Control Based on the Amount of Liquid in the Buffer Tank 220)

The gas and liquid power generation medium flows into the buffer tank 220 from the vaporizer 210. As described above, the liquid preferably does not contact the steam turbine of the power generator 230. Therefore, the control section 100 controls the mass flow rate of the power generation medium pump 250 based on the current amount of liquid in the buffer tank 220 and a level instruction value 86 indicating an upper limit of the amount of liquid in the buffer tank 220 set for the control section 100.

Specifically, the control section 100 inputs the level instruction value 86 provided to the control section 100 to the PI adjuster 42 as the SV. The control section 100 inputs the amount of liquid measured by a liquid scale 20 that measures the amount of liquid in the buffer tank 220 to the PI adjuster 42 as the PV. The PI adjuster 42 calculates the MV to bring the PV closer to the SV. The PI adjuster 42 inputs the calculated MV into an input terminal B of the low level selector 90. The SV that is the level instruction value 86 is the upper limit value of the PV, which is the amount of liquid.

The low level selector 90 calculates the change of the mass flow rate of the power generation medium pump 250 corresponding to the MV calculated by the PI adjuster 42. Compared to other PI adjusters and the like, if the change of the mass flow rate of the power generation medium pump 250 corresponding to the MV calculated by the PI adjuster 42 is the smallest, the control section 100 adjusts the mass flow rate of the power generation medium pump 250 by the MV calculated by the PI adjuster 42. In this way, it is possible to prevent the liquid from flowing into the steam turbine of the power generator 230 while maximizing the power generation amount.

When the mass flow rate of the power generation medium pump 250 decreases, the heat exchange amount between the exhaust gas and the power generation medium in the vaporizer 210 becomes greater compared to before the decrease of the mass flow rate. In this case, the amount of gas in the power generation medium in the buffer tank 220 becomes greater compared to before the decrease of the mass flow rate. In other words, it is only necessary to decrease the mass flow rate of the power generation medium pump 250 in order to increase the amount of gas in the power generation medium in the buffer tank 220. In the opposite manner, it is only necessary to increase the mass flow rate of the power generation medium pump 250 in order to decrease the amount of gas in the power generation medium in the buffer tank 220.

(Control Based on the Superheating Degree)

When the superheating degree is small, it is possible that the power generation medium in the gas state will condense and become a liquid. The control section 100 preferably controls the superheating degree such that the liquid does not contact the steam turbine of the power generator 230.

The control section 100 calculates the superheating degree of the power generation medium based on the temperature and pressure of the power generation medium measured by the second detector 29. Specifically, the superheating degree calculator 50 calculates the difference between the temperature of the saturated steam at the pressure measured by the pressure gauge 28 and the temperature of the superheated steam measured by the thermometer 27.

The control section 100 inputs a superheating degree instruction value 84 indicating a lower limit of the superheating degree set for the control section 100 to the PI adjuster 52 as the SV. Furthermore, the superheating degree calculator 50 inputs the calculated superheating degree to the PI adjuster 52 as the PV. The PI adjuster 52 calculates the MV to bring the PV closer to the SV. The PI adjuster 52 inputs the calculated MV to an input terminal E of the low level selector 90. The SV that is the superheating degree instruction value 84 is a lower limit value of the PV that is the calculated superheating degree.

The control section 100 controls the flow rate of the power generation medium pump 250 based on the superheating degree instruction value 84 and the calculated superheating degree of the power generation medium. The low level selector 90 calculates the change of the mass flow rate of the power generation medium pump 250 corresponding to the MV calculated by the PI adjuster 52. Compared to other PI adjusters and the like, if the change of the mass flow rate of the power generation medium pump 250 corresponding to the MV calculated by the PI adjuster 52 is the smallest, the control section 100 adjusts the mass flow rate of the power generation medium pump 250 by the MV calculated by the PI adjuster 52. In this way, it is possible to prevent the liquid from flowing into the steam turbine of the power generator 230, while maximizing the power generation amount.

(Control Based on the Power Generation Amount of the Power Generator 230)

The control section 100 controls the mass flow rate of the power generation medium pump 250 based on the mass flow rate of the power generation medium pump 250 determined based on the output instruction value 88 of the power generation set for the control section 100 and the current output of the power generator 230. Specifically, the control section 100 inputs the output instruction value 88 provided to the control section 100 to the PI adjuster 60 as the SV. The output instruction value 88 is the requested power generation amount for the binary power generation apparatus 500.

The power generating section 200 includes a power measuring unit 26 that measures the current output of the power generator 230. The control section 100 inputs the output measured by the power measuring unit 26 to the PI adjuster 60 as the PV. The PI adjuster 60 calculates the MV to bring the PV closer to the SV. The PI adjuster 60 inputs the calculated MV to an input terminal A of the low level selector 90.

The low level selector 90 calculates the change of the mass flow rate of the power generation medium pump 250 corresponding to the MV calculated by the PI adjuster 60. Compared to other PI adjusters and the like, if the change of the mass flow rate of the power generation medium pump 250 corresponding to the MV calculated by the PI adjuster 60 is the smallest, the control section 100 adjusts the flow rate of the power generation medium pump 250 by the MV calculated by the PI adjuster 60. In this way, it is possible for the power generating section 200 to generate power according to the requested power generation amount.

The output instruction value 88 is a target value that is a target for the power generating section 200. The control section 100 controls the mass flow rate of the power generation medium pump 250 to realize the power generation amount basically determined according to the output instruction value 88. For example, if the output of the current power generator 230 is less than the output instruction value 88, it is necessary for the control section 100 to increases the mass flow rate of the power generation medium pump 250. It should be noted that the mass flow rate of the power generation medium pump 250 also affects the temperature of the exhaust gas to be expelled, the amount of water in the buffer tank 220, the superheating degree, and the supercooling degree. Therefore, the degree to which the mass flow rate of the power generation medium pump 250 is controlled obeys the determination of the low level selector 90.

(Control Based on the Supercooling Degree)

The supercooling degree of the power generation medium in the condenser 240 changes according to the mass flow rate of the power generation medium pump 250. For example, if the volumetric flow rate of the cooling medium is constant, the supercooling degree becomes smaller as the mass flow rate of the power generation medium increases. In contrast, if the volumetric flow rate of the cooling medium is constant, the supercooling degree becomes larger as the mass flow rate of the power generation medium decreases. The supercooling degree of the power generation medium also changes according to the volumetric flow rate of the cooling medium. For example, if the mass flow rate of the power generation medium is constant, the supercooling degree becomes smaller as the volumetric flow rate of the cooling medium in the cooling section 300 decreases. In contrast, if the mass flow rate of the power generation medium is constant, the supercooling degree becomes larger as the volumetric flow rate of the cooling medium in the cooling section 300 increases.

When the supercooling degree increases, the drive load of the power generation medium pump 250 increases. A drive load that is larger than necessary causes power loss in the power generating section 200. The control section 100 inputs a supercooling degree instruction value 89 provided to the control section 100 to the PI adjuster 72 as the SV. Furthermore, the supercooling degree calculator 70 of the control section 100 calculates the supercooling degree of the power generation medium based on the temperature and pressure of the power generation medium measured by the first detector 25.

Specifically, the supercooling degree calculator 70 calculates the supercooling degree from the difference between the saturation temperature of the liquid at the pressure measured by the pressure gauge 24 and the temperature of the liquid measured by the thermometer 22. The supercooling degree calculator 70 inputs the calculated supercooling degree to the PI adjuster 72 as the PV. By performing control such that the supercooling degree of the power generation medium does not exceed the supercooling degree instruction value 89, it is possible to prevent the drive load of the power generation medium pump 250 from becoming larger than necessary. In this way, it is possible to prevent power loss in the binary power generation apparatus 500.

The PI adjuster 72 inputs the calculated MV to the split computing unit 74. The split computing unit 74 of the control section 100 calculates the mass flow rate of the power generation medium pump 250 and the volumetric flow rate of the cooling medium pump 320 based on the temperature and the pressure of the power generation medium measured by the first detector 25. Specifically, with the MV calculated by the PI adjuster 72 as one input signal, the split computing unit 74 calculates the MV of the power generation medium pump 250 and the MV of the cooling medium pump 320 as two output signals. In this way, the split computing unit 74 of the control section 100 calculates the mass flow rate of the power generation medium pump 250 and the volumetric flow rate of the cooling medium pump 320 based on the supercooling degree instruction value 89 of the cooling medium set for the control section 100 and the measured supercooling degree.

Figure 3:
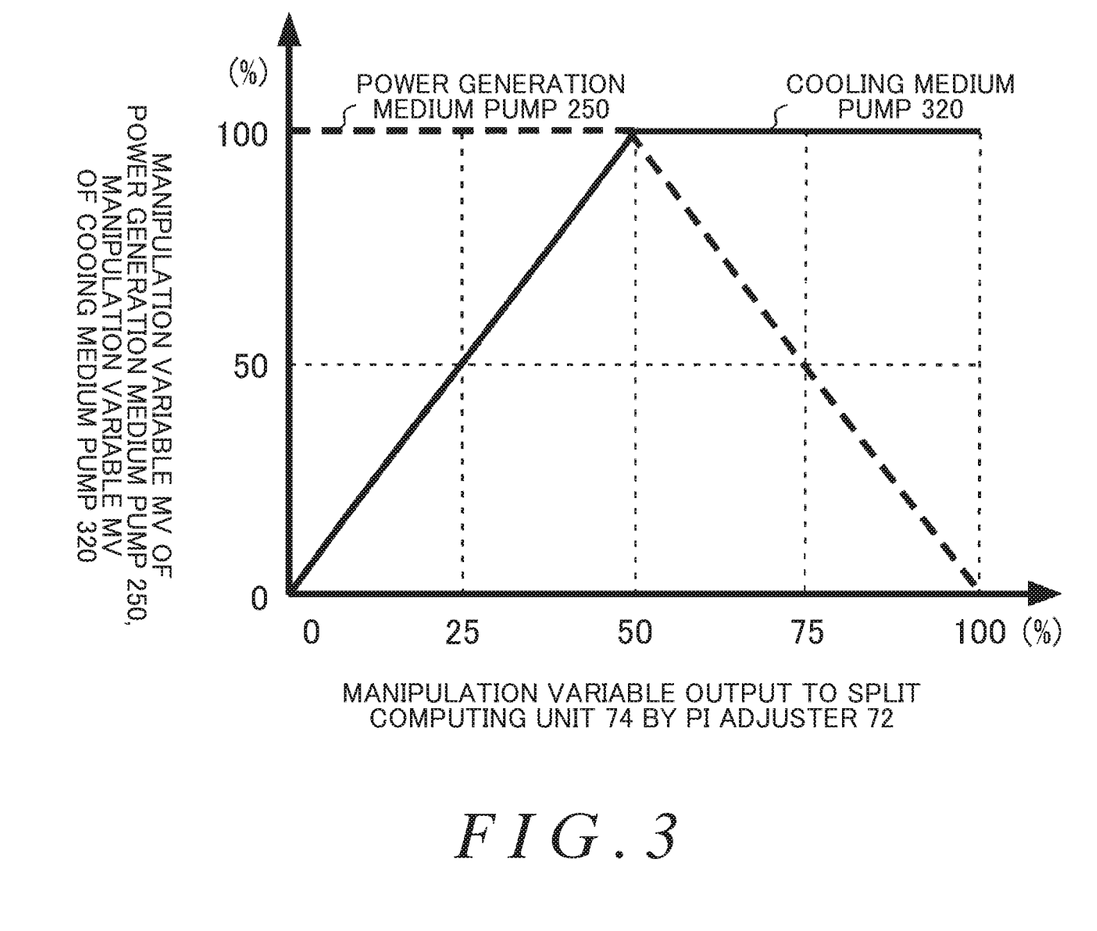
FIG. 3 shows an example of the calculation by the split computing unit 74.

The specific calculation method of the output signal in the split computing unit 74 is described in FIG. 3. The split computing unit 74 adjusts the output of the cooling medium pump 320 to not exceed 100%. In this way, the cooling medium pump 320 is protected. The split computing unit 74 inputs the calculated MV of the power generation medium pump 250 to the input terminal C of the low level selector 90. The SV that is the supercooling degree instruction value 89 is the lower limit value of the PV that is the calculated supercooling degree.

The control section 100 controls at least one of the mass flow rate of the power generation medium pump 250 and the volumetric flow rate of the cooling medium pump 320, based on the mass flow rate of the power generation medium pump 250 and the volumetric flow rate of the cooling medium pump 320 calculated by the split computing unit 74. The control section 100 in the present example receives the calculation result of the split computing unit 74 and constantly controls the volumetric flow rate of the cooling medium pump 320. However, whether the calculation result of the split computing unit 74 is received and the mass flow rate of the power generation medium pump 250 is controlled is determined by the low level selector 90 comparing the changes of the mass flow rates of the power generation medium pump 250 corresponding to the output of other PI adjusters. Specifically, compared to the change of the mass flow rates of the power generation medium pump 250 calculated from the MVs of other PI adjusters, if the change of the mass flow rate of the power generation medium pump 250 calculated by the split computing unit 74 is the smallest, the control section 100 adjusts the mass flow rate of the power generation medium pump 250 to be this smallest mass flow rate.

After at least one of the mass flow rate of the power generation medium pump 250 and the volumetric flow rate of the cooling medium pump 320 has been controlled, the supercooling degree of the power generation medium changes. Therefore, the control section 100 may control at least one of the mass flow rate of the power generation medium pump 250 and the volumetric flow rate of the cooling medium pump 320 according to the fluctuation of the supercooling degree of the power generation medium in the condenser 240. The supercooling degree calculator 70 of the control section 100 in the present example calculates the supercooling degree of the power generation medium that has been changed as a result of at least one of the mass flow rate of the power generation medium pump 250 and the volumetric flow rate of the cooling medium pump 320 being controlled based on the previously calculated flow rates, and again calculates the mass flow rate of the power generation medium pump 250 and the volumetric flow rate of the cooling medium pump 320 further based on the supercooling degree instruction value 89 of the cooling medium set for the control section 100. The above describes a detailed mass flow control method. In this way, it is possible to prevent power loss in the binary power generation apparatus 500.

(The Display Apparatus)

The binary power generation apparatus 500 further includes the display apparatus 120. The control section 100 controls the display of a screen in the display apparatus 120. When the power generation amount set for the power generator 230 of the control section 100 is limited by the output instruction value 88, the control section 100 displays whether the power generation amount of the power generator 230 is limited in the display apparatus 120, using one of the dew point temperature of the exhaust gas, the supercooling degree instruction value 89 of the cooling medium, the superheating degree instruction value 84 indicating the lower limit of the superheating degree, and the level instruction value 86 indicating the upper limit of the amount of liquid in the buffer tank 220.

The display apparatus 120 in the present example displays "D: exhaust gas temperature limitation" when the requested power generation amount is limited more strictly by the dew point temperature of the exhaust gas than by the output instruction value 88. Furthermore, the display apparatus 120 displays "C: cooling water temperature limitation" when the requested power generation amount is limited more strictly by the supercooling degree instruction value 89 of the cooling medium than by the output instruction value 88.

Furthermore, the display apparatus 120 displays "E: medium temperature limitation" when the requested power generation amount is limited more strictly by the superheating degree instruction value 84 indicating the lower limit of the superheating degree than by the output instruction value 88. The display apparatus 120 displays "B: buffer tank water level limitation" when the requested power generation amount is limited more strictly by the level instruction value 86 indicating the upper limit of the amount of water in the buffer tank 220 than by the output instruction value 88. The display apparatus 120 displays "F: no limitation" when the requested power generation amount is not limited with respect to the output instruction value 88.

In this way, the user can know which of the dew point temperature of the exhaust gas, the supercooling degree instruction value 89, the superheating degree instruction value 84, and the level instruction value 86 is limiting the requested power generation amount. The user can change the instruction value of one of the supercooling degree instruction value 89, the superheating degree instruction value 84, and the level instruction value 86 to realize the requested power generation amount.

The display apparatus 120 displays the output instruction value 88 as "output instruction value" in the display apparatus 120. The display apparatus 120 displays the power generation amount of the power generator 230 as "current power generation amount" in the display apparatus 120. The display apparatus 120 may display the "maximum power generation amount."

The control section 100 in the present example includes a specific enthalpy difference calculator 32 and a computing unit 34. The specific enthalpy difference calculator 32 calculates a specific enthalpy difference from the sulfuric acid dew point temperature calculated by the sulfuric acid dew point calculator 30 and the temperature of the exhaust gas measured by the thermometer 10. The computing unit 34 calculates the maximum power generation amount of the binary power generation apparatus 500 from the calculated specific enthalpy difference and the power generation efficiency 82 provided to the control section 100. The control section 100 displays the maximum power generation amount calculated by the computing unit 34 in the display apparatus 120 as the "maximum power generation amount." In this way, the user can easily monitor the "output instruction value," the "current power generation amount," and the "maximum power generation amount."

In the present example, the low level selector 90 converts the MVs input to the input terminals A to E into change amounts of the mass flow rate of the power generation medium pump 250, and selects the smallest change amount. Here, there are various combinations of MVs that can be the target of the comparison by the low level selector 90.

For example, the low level selector 90 may control the mass flow rate of the power generation medium pump 250 based on only one of the MV of the PI adjuster 40 and the MV of the PI adjuster 60. In other words, the low level selector 90 may control the mass flow rate of the power generation medium pump 250 based on only one of (1) the mass flow rate of the power generation medium pump 250 determined based on the dew point temperature and the exhaust temperature of the exhaust gas and (2) the mass flow rate of the power generation medium pump 250 determined based on the output instruction value 88 and the current output of the power generator 230.

More specifically, the low level selector 90 may compare (1) the change amount of the mass flow rate of the power generation medium pump 250 calculated by the PI adjuster 42 and the low level selector 90 from the dew point temperature and the exhaust temperature of the exhaust gas and (2) the change amount of the mass flow rate of the power generation medium pump 250 calculated by the PI adjuster 60 and the low level selector 90 from the output instruction value 88 and the current output of the power generator 230, and control the mass flow rate of the power generation medium pump 250 according to the smallest change amount among (1) and (2).

As another example, the low level selector 90 may control the mass flow rate of the power generation medium pump 250 based on only one of the MV of the PI adjuster 40, the MV of the PI adjuster 60, and the MV of the split computing unit 74. In other words, the low level selector 90 may control the mass flow rate of the power generation medium pump 250 based on only one of (1) the mass flow rate of the power generation medium pump 250 determined based on the dew point temperature and the exhaust temperature of the exhaust gas, (2) the mass flow rate of the power generation medium pump 250 determined based on the output instruction value 88 and the current output of the power generator 230, and (3) the mass flow rate of the power generation medium pump 250 determined based on the supercooling degree instruction value 89 and the supercooling degree calculated by the supercooling degree calculator 70. When (1) to (3) are compared, the split computing unit 74 may control the volumetric flow rate of the cooling medium pump 320 based on the supercooling degree instruction value 89 and the supercooling degree calculated by the supercooling degree calculator 70.

More specifically, the control section 100 controls the volumetric flow rate of the cooling medium pump 320 according to the determination by the split computing unit 74 from the supercooling degree instruction value 89 and the supercooling degree calculated by the supercooling degree calculator 70, compares (1) the change amount of the mass flow rate of the power generation medium pump 250 calculated by the PI adjuster 42 and the low level selector 90 from the dew point temperature and the exhaust temperature of the exhaust gas, (2) the change amount of the mass flow rate of the power generation medium pump 250 calculated by the PI adjuster 60 and the low level selector 90 from the output instruction value 88 and the current output of the power generator 230, and (3) the change amount of the mass flow rate of the power generation medium pump 250 calculated by the split computing unit 74 and the low level selector 90 from the supercooling degree instruction value 89 and the supercooling degree calculated by the supercooling degree calculator 70, and adjusts the mass flow rate of the power generation medium pump 250 based on the smallest change amount among (1) to (3).

As yet another example, the low level selector 90 may control the mass flow rate of the power generation medium pump 250 based on only one of the MV of the PI adjuster 40, the MV of the PI adjuster 60, the MV of the split computing unit 74, the MV of the PI adjuster 42, and the MV of the PI adjuster 52. In other words, the low level selector 90 may control the mass flow rate of the power generation medium pump 250 based on only one of (1) the mass flow rate of the power generation medium pump 250 determined based on the dew point temperature and the exhaust temperature of the exhaust gas, (2) the mass flow rate of the power generation medium pump 250 determined based on the output instruction value 88 and the current output of the power generator 230, (3) the mass flow rate of the power generation medium pump 250 determined based on the supercooling degree instruction value 89 and the supercooling degree calculated by the supercooling degree calculator 70, (4) the mass flow rate of the power generation medium pump 250 determined based on the level instruction value 86 and the current amount of liquid measured by the liquid scale 20, and (5) the mass flow rate of the power generation medium pump 250 determined based on the superheating degree instruction value 84 and the superheating degree calculated by the superheating degree calculator 50. When (1) to (5) are compared, the split computing unit 74 may control the volumetric flow rate of the cooling medium pump 320 based on the supercooling degree instruction value 89 and the supercooling degree calculated by the supercooling degree calculator 70.

More specifically, the control section 100 controls the volumetric flow rate of the cooling medium pump 320 according to the determination by the split computing unit 74 from the supercooling degree instruction value 89 and the supercooling degree calculated by the supercooling degree calculator 70, compares (1) the change amount of the mass flow rate of the power generation medium pump 250 calculated by the PI adjuster 42 and the low level selector 90 from the dew point temperature and the exhaust temperature of the exhaust gas, (2) the change amount of the mass flow rate of the power generation medium pump 250 calculated by the PI adjuster 60 and the low level selector 90 from the output instruction value 88 and the current output of the power generator 230, (3) the change amount of the mass flow rate of the power generation medium pump 250 calculated by the split computing unit 74 and the low level selector 90 from the supercooling degree instruction value 89 and the supercooling degree calculated by the supercooling degree calculator 70, (4) the mass flow rate of the power generation medium pump 250 calculated by the low level selector 90 from the level instruction value 86 and the current amount of liquid measured by the liquid scale 20, and (5) the mass flow rate of the power generation medium pump 250 calculated by the low level selector 90 from the superheating degree instruction value 84 and the superheating degree calculated by the superheating degree calculator 50, and adjusts the mass flow rate of the power generation medium pump 250 based on the smallest change amount among (1) to (5).

FIG. 3 shows an example of the calculation by the split computing unit 74. The horizontal axis indicates the MV (referred to below as the input value from the PI adjuster 72) that is the manipulation variable output to the split computing unit 74 by the PI adjuster 72. The lower limit of the input value is 0%, and the upper limit of the input value is 100%. The vertical axis indicates the MV that is the manipulation variable of the power generation medium pump 250 and the MV that is the manipulation variable of the cooling medium pump 320. The vertical axis has a lower limit of 0% and an upper limit of 100%.

The dotted line FIG. 3 indicates the output value in response to the input value from the PI adjuster 72. This corresponds to the MV of the power generation medium pump 250. The solid line in FIG. 3 indicates the output value in response to the input value from the PI adjuster 72. This corresponds to the MV of the cooling medium pump 320. In this way, the split computing unit calculates two output values in response to one input value.

The split computing unit 74 in the present example causes the MV of the power generation medium pump 250 to be constant at 100%, when the input value from the PI adjuster 72 is in a range from 0% to 50%. However, when the input value from the PI adjuster 72 is in a range from 50% to 100%, the split computing unit 74 causes the MV of the power generation medium pump 250 to decrease linearly from 100% to 0%.

In contrast to this, when the input value from the PI adjuster 72 is in a range from 0% to 50%, the split computing unit 74 causes the MV of the cooling medium pump 320 to increase linearly from 0% to 100%. However, when the input value from the PI adjuster 72 is in a range from 50% to 100%, the split computing unit 74 causes the MV of the cooling medium pump 320 to be constant at 100%.

For example, when the input value from the PI adjuster 72 is 25%, the MV of the power generation medium pump 250 is 100% and the MV of the cooling medium pump 320 is 50%. In other words, when the supercooling degree of the power generation medium pump 250 is near the supercooling degree instruction value 89, the MV of the power generation medium pump 250 is made the maximum and the MV of the cooling medium pump 320 is made smaller than the MV of the power generation medium pump 250.

In contrast to this, when the input value from the PI adjuster 72 is 75%, the MV of the power generation medium pump 250 is 50% and the MV of the cooling medium pump 320 is 100%. In other words, when the supercooling degree of the power generation medium pump 250 is far from the supercooling degree instruction value 89, the MV of the cooling medium pump 320 is made the maximum and the MV of the power generation medium pump 250 is made smaller than the MV of the cooling medium pump 320. Specifically, when the cooling medium pump 320 operates at the maximum amount with respect to the supercooling degree instruction value 89, the output of the power generation medium pump 250 is decreased. In this way, by preventing the output of cooling medium pump 320 from exceeding 100%, it is possible to protect the cooling medium pump 320.

Figure 4:
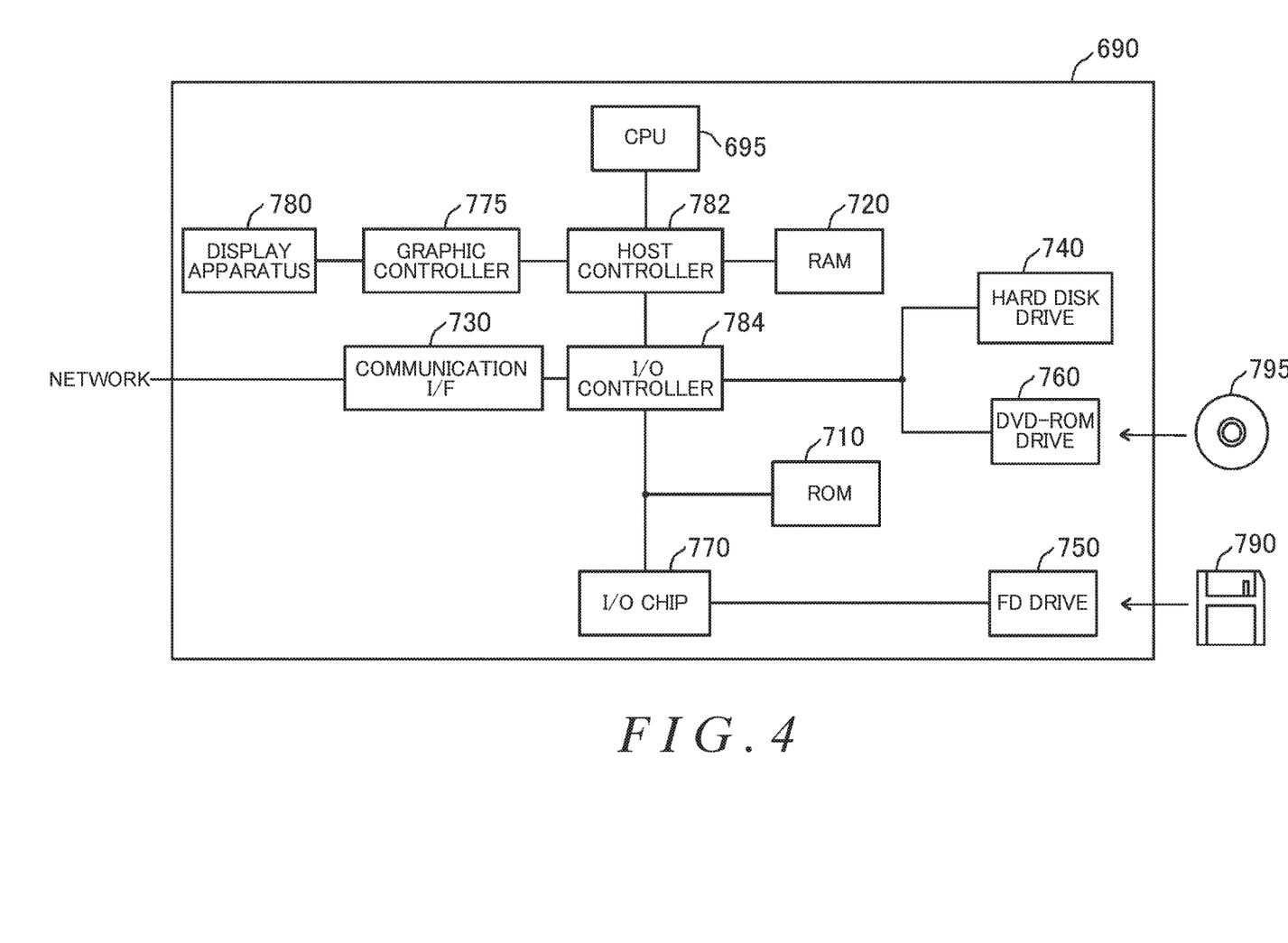
FIG. 4 shows an example of a hardware configuration of a computer 690 according to the present embodiment.

FIG. 4 shows an example of a hardware configuration of a computer 690 according to the present embodiment. The computer 690 is provided with a CPU peripheral including a CPU 695, a RAM 720, a graphic controller 775, and a display apparatus 780, all of which are connected to each other by a host controller 782; an input/output section including a communication interface 730, a hard disk drive 740, and a CD-ROM drive 760, all of which are connected to the host controller 782 by an input/output controller 784; and a legacy input/output section including a ROM 710, a flexible disk drive 750, and an input/output chip 770, all of which are connected to the input/output controller 784.

The host controller 782 is connected to the RAM 720 and is also connected to the CPU 695 and graphic controller 775 accessing the RAM 720 at a high transfer rate. The CPU 695 operates to control each section based on programs stored in the ROM 710 and the RAM 720. The graphic controller 775 acquires image data generated by the CPU 695 or the like on a frame buffer disposed inside the RAM 720 and displays the image data in the display apparatus 780. Instead, the graphic controller 775 may internally include the frame buffer storing the image data generated by the CPU 695 or the like.

The input/output controller 784 connects the communication interface 730 serving as a relatively high speed input/output apparatus, and the hard disk drive 740, and the CD-ROM drive 760 to the host controller 782. The communication interface 730 communicates with other apparatuses via a network. The hard disk drive 740 stores the programs and data used by the CPU 695 housed in the computer 690. The CD-ROM drive 760 reads programs or data from the CD-ROM 795, and provides the programs or data to the hard disk drive 740 via the RAM 720.

Furthermore, the input/output controller 784 is connected to the ROM 710, and is also connected to the flexible disk drive 750 and the input/output chip 770 serving as a relatively high speed input/output apparatus. The ROM 710 stores a boot program performed when the computer 690 starts up, a program relying on the hardware of the computer 690, and the like. The flexible disk drive 750 reads programs or data from a flexible disk 790 and supplies the read information to the hard disk drive 740 via the RAM 720. The input/output chip 770 connects the flexible disk drive 750 to the input/output controller 784 along with each of the input/output apparatuses via, a parallel port, a serial port, a keyboard port, a mouse port, or the like.

The programs provided to the hard disk drive 740 via the RAM 720 are stored in a storage medium, such as the flexible disk 790, the CD-ROM 795, or an IC card, and provided by a user. The programs are read from storage medium, installed in the hard disk drive 740 inside the computer 690 via the RAM 720, and performed by the CPU 695.

The programs are installed in the computer 690 and cause the computer 690 to function as a sulfuric acid dew point calculating module, a specific enthalpy difference calculating module, a computing module, a superheating degree calculating module, a supercooling degree calculating module, a split computing module, a low level selecting module, and a PI adjusting module. These programs and modules prompt the CPU 695 or the like to make the computer 690 function as a control apparatus. This control apparatus is a single apparatus that is independent from the control section 100 in FIGS. 1 and 2.

The information processes recorded in the programs are read by the computer 690 to cause the computer 690 to function as software and hardware described above, which are exemplified by the specific means of the sulfuric acid dew point calculating module, the specific enthalpy difference calculating module, the computing module, the superheating degree calculating module, the supercooling degree calculating module, the split computing module, the low level selecting module, and the PI adjusting module. With these specific means, a unique control apparatus suitable for an intended use can be configured by realizing the calculations or computations appropriate for the intended use of the computer 690 of the present embodiment.

For example, if there is communication between the computer 690 and an external apparatus or the like, the CPU 695 performs the communication program loaded in the RAM 720, and provides the communication interface 730 with communication processing instructions based on the content of the process recorded in the communication program. The communication interface 730 is controlled by the CPU 695 to read the transmission data stored in the transmission buffer area or the like on the storage apparatus, such as the RAM 720, the hard disk drive 740, the flexible disk 790, or the CD-ROM 795, and send this transmission data to the network, and to write data received from the network onto a reception buffer area on the storage apparatus. In this way, the communication interface 730 may transmit data to and from the storage apparatus through DMA (Direct Memory Access). As another possibility, the CPU 695 may transmit the data by reading the data from the storage apparatus or communication interface 730 that are the origins of the transmitted data, and writing the data onto the communication interface 730 or the storage apparatus that are the transmission destinations.

The CPU 695 may perform various processes on the data in the RAM 720 by reading into the RAM 720, through DMA transmission or the like, all or a necessary portion of the database or files stored in the external apparatus such as the hard disk drive 740, the CD-ROM drive 760, the CD-ROM 795, the flexible disk drive 750, or the flexible disk 790. The CPU 695 writes the processed data back to the external apparatus through DMA transmission or the like. In this process, the RAM 720 is considered to be a section that temporarily stores the content of the external storage apparatus, and therefore the RAM 720, the external apparatus, and the like in the present embodiment are referred to as a memory, a storage section, and a storage apparatus. The variety of information in the present embodiment, such as the variety of programs, data, tables, databases, and the like are stored on the storage apparatus to become the target of the information processing. The CPU 695 can hold a portion of the RAM 720 in a cache memory and read from or write to the cache memory. With such a configuration as well, the cache memory serves part of the function of the RAM 720, and therefore the cache memory is also included with the RAM 720, the memory, and/or the storage apparatus in the present invention, except when a distinction is made.

The CPU 695 executes the various processes such as the computation, information processing, condition judgment, searching for/replacing information, and the like included in the present embodiment for the data read from the RAM 720, as designated by the command sequence of the program, and writes the result back onto the RAM 720. For example, when performing condition judgment, the CPU 695 judges whether a variable of any type shown in the present embodiment fulfills a condition of being greater than, less than, no greater than, no less than, or equal to another variable or constant. If the condition is fulfilled, or unfulfilled, depending on the circumstances, the CPU 695 branches into a different command sequence or acquires a subroutine.

The CPU 695 can search for information stored in a file in the storage apparatus, the database, and the like. For example, if a plurality of entries associated respectively with a first type of value and a second type of value are stored in the storage apparatus, the CPU 695 can search for entries fulfilling a condition designated by the first type of value from among the plurality of entries stored in the storage apparatus. The CPU 695 can then obtain the second type of value associated with the first type of value fulfilling the prescribed condition by reading the second type of value stored at the same entry.

The programs and modules shown above may also be stored in an external storage medium. The flexible disk 790, the CD-ROM 795, an optical storage medium such as a DVD or CD, a magneto-optical storage medium, a tape medium, a semiconductor memory such as an IC card, or the like can be used as the storage medium. Furthermore, a storage apparatus such as a hard disk or RAM that is provided with a server system connected to the Internet or a specialized communication network may be used to provide the programs to the computer 690 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: thermometer, 12: concentration sensor, 16: thermometer, 20: liquid scale, 22: thermometer, 24: pressure gauge, 25: first detector, 26: power measuring unit, 27: thermometer, 28: pressure gauge, 29: second detector, 30: sulfuric acid dew point calculator, 32: specific enthalpy difference calculator, 34: computing unit, 40: PI adjuster, 42: PI adjuster, 50: superheating degree calculator, 52: PI adjuster, 60: PI adjuster, 70: supercooling degree calculator, 72: PI adjuster, 74: split computing unit, 80: sulfur concentration data, 82: power generation efficiency, 84: superheating degree instruction value, 86: level instruction value, 88: output instruction value, 89: supercooling degree instruction value, 90: low level selector, 100: control section, 120: display apparatus, 200: power generating section, 210: vaporizer, 220: buffer tank, 230: power generator, 240: condenser, 250: power generation medium pump, 300: cooling section, 320: cooling medium pump, 400: main engine, 450: exhaust gas economizer, 500: binary power generation apparatus, 600: binary power generation system, 690: computer, 695: CPU, 710: ROM, 720: RAM, 730: communication interface, 740: hard disk drive, 750: flexible disk drive, 760: CD-ROM drive, 770: I/O chip, 775: graphic controller, 780: display apparatus, 782: host controller, 784: I/O controller, 790: flexible disk, 795: CD-ROM

What is claimed is:

1. A binary power generation system comprising:
   a binary power generation apparatus that generates power by vaporizing a power generation medium using heat of exhaust gas output from a drive apparatus, wherein the binary power generation apparatus includes:
   a power generating section having a vaporizer into which is introduced the power generation medium that exchanges the heat with the exhaust gas; a power generator that generates the power using the power generation medium vaporized by the vaporizer; a condenser that liquefies the power generation medium vaporized in the vaporizer and expelled from the power generator; and a power generation medium pump that causes the power generation medium liquefied by the condenser to flow into the vaporizer;
   a cooling section for cooling the power generation medium in the condenser; and,
   a control section that controls a mass flow rate of the power generation medium pump; wherein
   the cooling section includes a cooling medium pump that causes a cooling medium to flow into the condenser; and
   the control section controls a volumetric flow rate of the cooling medium pump according to fluctuation of a supercooling degree of the power generation medium in the condenser that changes according to the mass flow rate of the power generation medium pump; wherein
   the control section controls the mass flow rate of the power generation medium pump based on only one of (i) a determination of mass flow rate of the power generation medium pump based on a sulfur concentration of the exhaust gas, a dew point temperature of the exhaust gas between the drive apparatus and the vaporizer, and an exhaust temperature, which is a temperature of the exhaust gas expelled from the vaporizer and (ii) the determination of mass flow rate of the power generation medium pump based on an output instruction value of power generation set for the control section and a current output of the power generator.

2. The binary power generation system according to claim 1, wherein
   the control section adjusts the mass flow rate of the power generation medium pump based on a smaller of:
   a change amount of the mass flow rate of the power generation medium pump determined based on the dew point temperature and the exhaust temperature of the exhaust gas, and
   a change amount of the mass flow rate of the power generation medium pump determined based on the output instruction value and the current output.

3. A binary power generation system comprising:
   a binary power generation apparatus that generates power by vaporizing a power generation medium using heat of exhaust gas output from a drive apparatus, wherein the binary power generation apparatus includes:
   a power generating section having a vaporizer into which is introduced the power generation medium that exchanges heat with the exhaust gas; a power generator that generates the power using power generation medium vaporized by the vaporizer; a condenser that liquefies the power generation medium vaporized by the vaporizer and expelled from the power generator; a power generation medium pump that causes the power generation medium liquefied by the condenser to flow into the vaporizer and a first detector that measures temperature and pressure of the power generation medium between the condenser and the power generation medium pump;
   a cooling section for cooling the power generation medium in the condenser; and, a control section that controls a mass flow rate of the power generation medium pump; wherein
   the cooling section includes a cooling medium pump that causes a cooling medium to flow into the condenser; and
   the control section calculates a supercooling degree of the power generation medium based on the temperature and the pressure of the power generation medium measured by the first detector, and
   the control section calculates a mass flow rate of the volumetric flow rate of the cooling medium pump based on the supercooling degree of the power generation medium and a supercooling degree instruction value of the cooling medium set for the control section and wherein
   the control section controls the mass flow rate of the power generation medium pump based on only one of (i) a determination of mass flow rate of the power generation medium pump based on a sulfur concentration of the exhaust gas, a dew point temperature of the exhaust gas between the drive apparatus and the vaporizer and an exhaust temperature, which is a temperature of the exhaust gas expelled from the vaporizer, (ii) a determination of mass flow rate of the power generation medium pump based on an output instruction value of power generation set for the control section and a current output of the power generator, and (iii) a determination of mass flow rate of the power generation medium pump based on the supercooling degree instruction value and the supercooling degree.

4. The binary power generation system according to claim 3, wherein
   the control section controls the cooling medium pump based on the supercooling degree instruction value and the supercooling degree, and adjusts the mass flow rate of the power generation medium pump based on a smallest of:
   a change amount of the mass flow rate of the power generation medium pump determined based on the dew point temperature and the exhaust temperature of the exhaust gas,
   a change amount of the mass flow rate of the power generation medium pump determined based on the output instruction value and the current output, and a change amount of the mass flow rate of the power generation medium pump determined based on the supercooling degree instruction value and the supercooling degree.

5. A binary power generation system comprising:
a binary power generation apparatus that generates power by vaporizing a power generation medium using heat of exhaust gas output from a drive apparatus, wherein the binary power generation apparatus includes:
a power generating section having a vaporizer into which is introduced the power generation medium that exchanges heat with the exhaust gas; a power generator that generates the power using power generation medium vaporized by the vaporizer; a condenser that liquefies the power generation medium vaporized by the vaporizer and expelled from the power generator; a power generation medium pump that causes the power generation medium liquefied by the condenser to flow into the vaporizer; a first detector that measures temperature and pressure of the power generation medium between the condenser and the power generation medium pump;
a buffer tank that is provided between the vaporizer and the power generator and temporarily stores the power generation medium that was vaporized by the vaporizer and power generation medium that was not vaporized by the vaporizer; and a second detector that measures a temperature and a pressure of the power generation medium between the buffer tank and the power generator;
a cooling section for cooling the power generation medium in the condenser; and, a control section that controls a mass flow rate of the power generation medium pump; wherein
the cooling section includes a cooling medium pump that causes a cooling medium to flow into the condenser,
the control section calculates a supercooling degree of the power generation medium based on the temperature and the pressure of the power generation medium measured by the first detector,
the control section calculates a mass flow rate of the volumetric flow rate of the cooling medium pump based on the supercooling degree of the power generation medium and a supercooling degree instruction value of the cooling medium set for the control section; and
the control section calculates a superheating degree of the power generation medium based on the temperature and the pressure of the power generation medium measured by the second detector; wherein
the control section controls a mass flow rate of the power generation medium pump based on only one of (i) a determination of mass flow rate of the power generation medium pump based on a sulfur concentration of the exhaust gas, a dew point temperature of the exhaust gas between the drive apparatus and the vaporizer and an exhaust temperature, which is a temperature of the exhaust gas expelled from the vaporizer, (ii) a determination of mass flow rate of the power generation medium pump based on an output instruction value of power generation set for the control section and a current output of the power generator, (iii) a determination of mass flow rate of the power generation medium pump based on the supercooling degree instruction value and the supercooling degree, (iv) a determination of mass flow rate of the power generation medium pump based on a level instruction value indicating an upper limit of an amount of liquid in the buffer tank set for the control section and a current amount of liquid in the buffer tank, and (v) a determination of mass flow rate of the power generation medium pump based on a superheating degree instruction value indicating a lower limit of the superheating degree set for the control section and the calculated superheating degree.

6. The binary power generation system according to claim 5, wherein
the control section controls the cooling medium pump based on the supercooling degree instruction value and the supercooling degree, and adjusts the mass flow rate of the power generation medium pump based on a smallest of:
a change amount of the mass flow rate of the power generation medium pump determined based on the dew point temperature and the exhaust temperature of the exhaust gas,
a change amount of the mass flow rate of the power generation medium pump determined based on the output instruction value and the current output,
a change amount of the mass flow rate of the power generation medium pump determined based on the supercooling degree instruction value and the supercooling degree,
a change amount of the mass flow rate of the power generation medium pump determined based on the level instruction value and the current amount of liquid, and
a change amount of the mass flow rate of the power generation medium pump determined based on the superheating degree instruction value and the superheating degree.

7. A binary power generation system comprising:
a binary power generation apparatus that generates power by vaporizing a power generation medium using heat of an exhaust gas output from a drive apparatus, wherein the binary power generation apparatus includes:
a concentration sensor that measures a concentration of sulfur dioxide contained in the exhaust gas;
a buffer tank between the vaporizer and the power generator that temporarily stores the power generation medium that was vaporized by a vaporizer and the power generation medium that was not vaporized by the vaporizer;
a control section that controls a mass flow rate of the power generation medium based on at least:
the concentration of the sulfur dioxide measured by the concentration sensor and a conversion rate at which the sulfur dioxide is converted to sulfur trioxide,
a dew point temperature of the exhaust gas between the drive apparatus and the vaporizer,
an exhaust temperature, which is a temperature of the exhaust gas expelled from the vaporizer, and
the control section controls a volumetric flow rate of a cooling medium pump according to fluctuation of a supercooling degree of the power generation medium in a condenser that changes according to the mass flow rate of a power generation medium pump, and
the control section controls the mass flow rate of the power generation medium based on one or more of (i) a determination of mass flow rate of the power generation medium pump based on the dew point temperature and the exhaust temperature of the exhaust gas and (ii) a determination of mass flow rate of the power generation medium pump based on an output instruction value of power generation set for the control section and a current output of the power generator, and the control section controls the mass flow rate of the power generation medium pump further based on a level instruction value indicating an upper limit of an amount of liquid in the buffer tank set for the control section and a current amount of liquid in the buffer tank, the control section calculates the mass flow rate of the power generation medium pump and the volumetric flow rate of the cooling medium pump based on the temperature and the pressure of the power generation medium measured by a first detector, and the control section controls at least one of the mass flow rate of the power generation medium pump and the volumetric flow rate of the cooling medium pump based on the calculated mass flow rate and volumetric flow rate, and the control section calculates the supercooling degree of the power generation medium based on the temperature and the pressure of the power generation medium measured by the first detector, and the control section calculates the mass flow rate of the power generation medium pump and the volumetric flow rate of the cooling medium pump based on the supercooling degree of the power generation medium and a supercooling degree instruction value of the cooling medium set for the control section, and the control section calculates the supercooling degree of the power generation medium based on the temperature and the pressure of the power generation medium measured by the first detector, and the control section calculates the mass flow rate of the power generation medium pump and the volumetric flow rate of the cooling medium pump based on the supercooling degree of the power generation medium and a supercooling degree instruction value of the cooling medium set for the control section, the control section calculates a superheating degree of the power generation medium based on a temperature and a pressure of the power generation medium between the buffer tank and the power generator measured by a second detector, and the control section controls the mass flow rate of the power generation medium pump further based on a calculated superheating degree of the power generation medium and a superheating degree instruction value indicating a lower limit of the superheating degree set for the control section, the control section displays, in a display apparatus in response to an actual power generation amount being limited to be lower than the output instruction value, one of the dew point temperature of the exhaust gas, the supercooling degree instruction value of the cooling medium, the superheating degree instruction value indicating the lower limit of the superheating degree, and a level instruction value indicating an upper limit of an amount of liquid in the buffer tank that is causing the actual power generation amount to be limited, and a power generating section having a vaporizer and a power generator, wherein the power generation medium that exchanges heat with the exhaust gas is introduced into the vaporizer and the power generator generates power using the power generation medium vaporized by the vaporizer, and the first detector that measures temperature and pressure of the power generation medium between the condenser and the power generation medium pump, and the power generating section further includes the second detector that measures the temperature and the pressure of the power generation medium between the buffer tank and the power generator, a condenser that liquefies the power generation medium vaporized in the vaporizer and expelled from the power generator; and
a power generation medium pump that causes power generation medium liquefied by the condenser to flow into the vaporizer, and
a cooling section for cooling the power generation medium in the condenser, the cooling section includes a cooling medium pump that causes a cooling medium to flow into the condenser.

8. The binary power generation system according to claim 7, wherein
the binary power generation system is a power generation system for a ship and is provided in the ship.

* * * * *